(12) United States Patent
Bharath et al.

(10) Patent No.: US 6,792,286 B1
(45) Date of Patent: Sep. 14, 2004

(54) APPARATUS FOR TRANSMITTING AND RECEIVING SIGNALS

(75) Inventors: Jagannathan Bharath, Eldorado Hills, CA (US); David N. Larson, Austin, TX (US)

(73) Assignee: Legerity, Inc., Austin, TX (US)

(*) Notice: Subject to any disclaimer, the term of this patent is extended or adjusted under 35 U.S.C. 154(b) by 0 days.

(21) Appl. No.: 09/340,576

(22) Filed: Jun. 28, 1999

(51) Int. Cl.[7] .............................................. H04M 1/00
(52) U.S. Cl. ............................ 455/554.2; 455/426.2; 370/352; 379/93.01
(58) Field of Search ................................. 455/552, 553, 455/557, 434, 422, 426.2, 450, 554.2, 452, 509, 518; 370/355, 373, 352, 328; 379/93.01

(56) References Cited

U.S. PATENT DOCUMENTS

| | | | | |
|---|---|---|---|---|
| 4,697,281 A | * | 9/1987 | O'Sullivan | 455/126 |
| 5,619,567 A | * | 4/1997 | Apfel | 379/377 |
| 5,826,198 A | * | 10/1998 | Bergins et al. | 455/434 |
| 5,878,133 A | * | 3/1999 | Zhou et al. | 379/413 |
| 5,953,675 A | * | 9/1999 | Rabina et al. | 455/557 |
| 5,991,639 A | * | 11/1999 | Rautiola et al. | 370/338 |
| 6,052,595 A | * | 4/2000 | Schellinger et al. | 455/422 |
| 6,208,627 B1 | * | 3/2001 | Menon et al. | 370/328 |
| 6,336,041 B1 | * | 1/2002 | Vatalaro et al. | 455/561 |
| 6,353,748 B1 | * | 3/2002 | Cho | 455/557 |
| 6,400,701 B2 | * | 6/2002 | Lin et al. | 370/336 |
| 6,430,661 B1 | | 8/2002 | Larson et al. | 711/158 |
| 6,545,993 B1 | | 4/2003 | Bharath et al. | 370/337 |
| 6,560,652 B1 | | 5/2003 | Larson et al. | 709/232 |

\* cited by examiner

*Primary Examiner*—Charles Appiah
*Assistant Examiner*—Nghi H. Ly
(74) *Attorney, Agent, or Firm*—Williams, Morgan & Amerson, P.C.

(57) ABSTRACT

An apparatus is provided that includes a data controller, a subscriber line audio-processing circuit, and a controller. The data controller includes an input terminal and an output terminal capable of providing packet data. The subscriber line audio-processing circuit is capable of providing signals in a voice band. The controller is capable of transmitting at least one of signals in the voice band from the subscriber line audio-processing circuit and the packet data from the output terminal of the data controller.

19 Claims, 16 Drawing Sheets

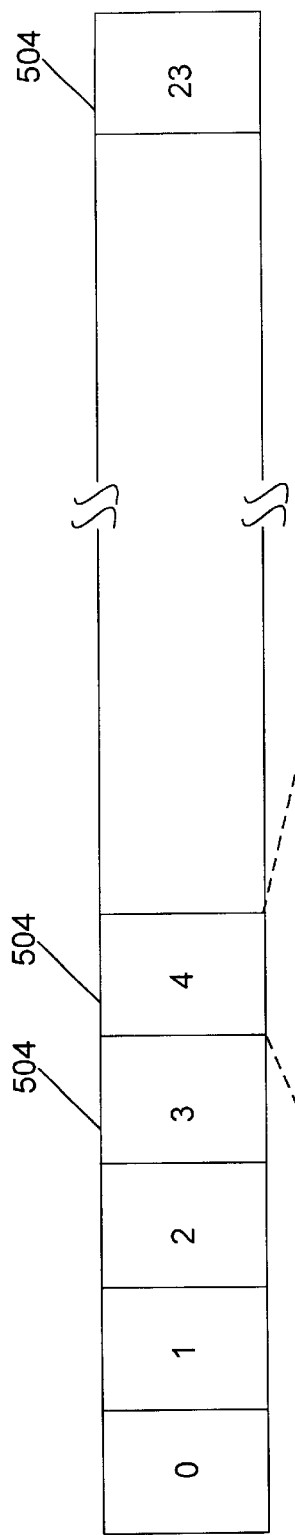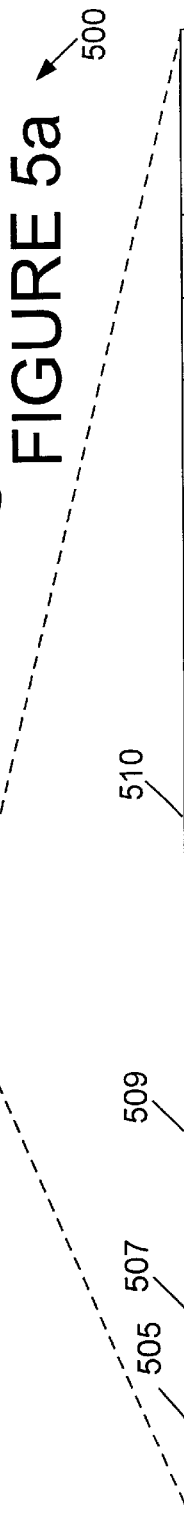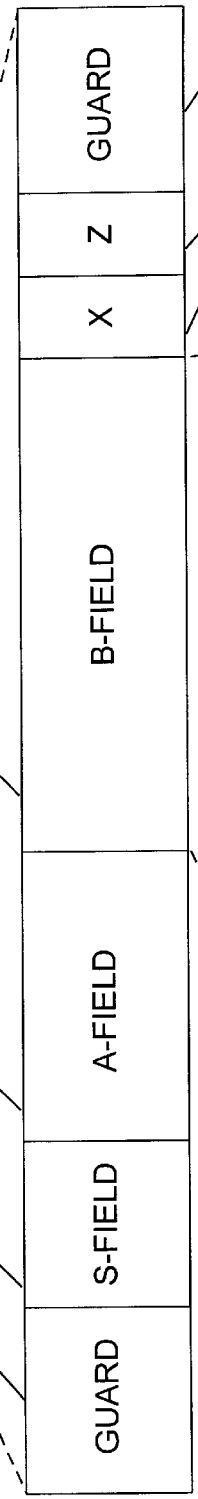

| SLOT # | PACKET DATA ACTIVE | CARRIER TYPE | PACKET DATA BUFFER |
|---|---|---|---|
| SLOT 0 | | | |
| SLOT 1 | | | |
| SLOT 2 | | | |
| SLOT 3 | | | |
| SLOT 4 | | | |
| ... | ... | ... | ... |
| SLOT 21 | | | |
| SLOT 22 | | | |
| SLOT 23 | | | |

| FRAME PORTION | LBNS | SLOT NUMBER |
|---|---|---|
| FIRST HALF OF THE FRAME | LBN1 | |
| | LBN2 | |
| | LBN3 | |
| | ••• | |
| | LBN13 | |
| | LBN14 | |
| SECOND HALF OF THE FRAME | LBN1 | |
| | LBN2 | |
| | LBN3 | |
| | ••• | |
| | LBN13 | |
| | LBN14 | |

| 0 | 1 | 2 | 3 | 4 | $\cdots$ | 23 |
|---|---|---|---|---|---|---|
| $I_p$ (bit) | $I_p$ (bit) | $I_p$ (bit) | $I_p$ (bit) | $I_p$ (bit) | $\cdots$ | $I_p$ (bit) |

| PRIMARY SLOT NUMBER 1ST HALF OF FRAME | HANDOVER SLOT NUMBER 1ST HALF OF FRAME | HANDOVER ACTIVE |
|---|---|---|
|  |  |  |

APPARATUS FOR TRANSMITTING AND RECEIVING SIGNALS

BACKGROUND OF THE INVENTION

1. Field of the Invention

This invention relates generally to transmission/reception of signals, and, more particularly, to an apparatus for supporting transmission/reception of voice signals, voiceband data, and packet data.

2. Description of the Related Art

Modern day electronic products, such as computers and telecommunications devices, are generally faster and more efficient than their predecessors. Two important factors that have contributed to the improved performance of today's electronic products is the efficiency and faster rate at which these products transmit and receive signals. However, given the customer demand for faster and more responsive products, designers are constantly seeking ways to achieve a higher bandwidth while controlling the costs.

The overall performance of applications, particularly real-time telecommunication applications, can be improved by increasing the bandwidth available for transmitting signals. One example of a real-time telecommunication application where an increased bandwidth is desirable is a Wireless Local Loop (WLL) network.

Wireless Local Loop is quickly emerging as the technology that promises to deliver telephone service in geographical areas where using conventional copper telephone lines is cost prohibitive, or in a case where a telephone line exists, radio access technologies such as WLL provide other companies an opportunity to provide competitive services. Installing the last quarter of a mile of the telephone wire to a subscriber station is usually one of the most costly portions of the traditional telephone network, primarily because of the expenses associated with labor and maintenance. The telephone companies, which are usually responsible for maintaining the telephone wire, are frequently plagued with the daunting task of repairing the damage to the telephone lines caused by inclement weather, falling trees, digging, and by the recurring problem of copper wire theft. Accordingly, to circumvent the problems that are typically associated with the "traditional" telephone network, system designers turned to WLL technology, which is proving to be a promising and viable alternative.

FIG. 1 illustrates a block diagram of a WLL network 100. The WLL network 100 includes a Wireless Subscriber Unit (WSU) 110 at a subscriber station 115 that communicates with a remote Basestation Transceiver System (BTS) 120. The data flow from the WSU 110 to the BTS 120 is referred to as an uplink connection, and the data flow from the BTS 120 to the WSU 110 is referred to as a downlink connection. The BTS 120 links the WSU 110 to a central office 130, thus allowing a user at the subscriber station 115 to communicate with other subscriber stations (not shown) through the central office 130. A connection 132 between the BTS 120 and the central office 130 may be made via a wire-line, fiber or microwave link, depending on the bandwidth, distance, and the terrain.

The heart of the WLL network 100 is the "wireless" interface between the BTS 120 and the WSU 110, where the need for the copper loop is eliminated. The WSU 110, located in the home or office, provides a radio frequency (RF) interface to an existing phone 135 or modem 140, usually through an RJ-11 type plug (not shown). The connection between the subscriber station 115 and the central office 130 is typically as reliable and clear as the copper wire version.

The counterpart to the WSU 110 is the BTS 120, which is generally located in the field. As is common in most wireless systems, the BTS 120 serves as a control station for the WSU 110 by providing, over a designated pilot channel, synchronization and control information necessary to initiate and maintain two-way communication. In communication systems employing time division multiple access (TDMA), a process well known in the art, the WSU 110 selects the channel frequency and the specific time slot based upon the availability and quality of the channels in the coverage area.

Most wireless communication systems, including the WLL network 100, operate in accordance with industry defined standards. For example, two popular standards for the WLL network 100 are Personal Handyphone System (PHS) and Digital Enhanced Cordless Telecommunications (DECT). The PHS and DECT standards, as well as other WLL standards, define the format for transmitting and receiving data, error checking algorithm, retransmission scheme, and other such parameters that are relevant to wireless communications systems.

The DECT standard for the WLL network 100, for example, defines a 10-millisecond TDMA frame that comprises twenty-four time slots, where generally twelve slots are reserved for transmitting and twelve for receiving. DECT supports voice, analog data, and packet data communications. Voice and analog data communications are full duplex, whereas packet data communications are simplex in nature. Packet data communications can take advantage of directing all slots in one direction, uplink or downlink, with the exception of one slot for the reverse acknowledgement channel. Depending upon the bandwidth allocated by the system, an uplink or downlink channel can utilize between one and twenty-three slots for transferring packet data. When no data is waiting to be sent, the bandwidth is de-allocated and assigned to other users. Thus, in an uplink connection, the BTS 120 of the WLL network 100 can transmit data on up to twenty-three slots that are allocated for transmitting data per each frame to the WSU 110. Assuming all of the data is successfully transmitted and received over the twenty-three time slots, then new data may be transmitted on the twenty-three transmit time slots of the next frame. On the other hand, if not all of the data is successfully transmitted to the BTS 120 because of transmission errors, then that data is retransmitted over the twenty-three transmit time slots in accordance with the DECT retransmission scheme.

The retransmission scheme of a DECT WLL network 100 requires an acknowledgement to be generated by the peer station on a slot-by-slot basis for duplex bearers. Double simplex bearers' acknowledgements are on a logical bearer number (LBN) basis contained in a MAC-MOD-2ACK message in a reverse bearer. The BTS 120 or the WSU 110 may be the peer station, depending on whether the connection is an uplink or downlink connection. That is, in an uplink connection, the BTS 120 is the peer station, and in a downlink connection, the WSU 110 is the peer station. A "good" acknowledgement, a request to advance, from the peer device indicates a good transmission and new data should be transmitted in the next frame. On the other hand, a "bad" acknowledgement, a request to retransmit, indicates a bad transmission, and thus requires retransmission of data that was not received correctly by the peer station.

The exchange of information between the WSU 110 and the BTS 120 occurs at very high speeds. Additionally, the high-speed communications between the WSU 110 and the BTS 120 is typically based on some sort of an acknowledgement scheme. To make an efficient use of the bandwidth available for communications, the WSU 110 and BTS 120 must generally be able to efficiently process and transmit/receive information in response to the acknowledgements transmitted from the peer station. For example, the WSU 110 must analyze the acknowledgements transmitted by the BTS 120 and determine if retransmission of data is required prior to transmission of the next available frame. Valuable bandwidth may be wasted if the WSU 110 is not able to timely process and transmit data in response to the acknowledgements from the BTS 120. Thus, to make efficient use of the bandwidth and thereby increasing data throughput, it desirable that the WSU 110 and the BTS 120 efficiently and expeditiously process the acknowledgements and then and transfer data to the peer station in response to the acknowledgements.

The present invention is directed to overcoming, or at least reducing the effects of, one or more of the problems set forth above.

SUMMARY OF THE INVENTION

In one aspect of the present invention, an apparatus is provided that includes a data controller, a subscriber line audio-processing circuit, and a controller. The data controller includes an input terminal and an output terminal capable of providing packet data. The subscriber line audio-processing circuit is capable of providing signals in a voice band. The controller is capable of transmitting at least one of signals in the voice band from the subscriber line audio-processing circuit and the packet data from the output terminal of the data controller.

BRIEF DESCRIPTION OF THE DRAWINGS

The invention may be understood by reference to the following description taken in conjunction with the accompanying drawings, in which like reference numerals identify like elements, and in which:

FIGS. 5a–c illustrate a DECT frame that may be utilized for transmitting packet data in accordance with the present invention;

FIG. 8 depicts an embodiment of a slot to buffer link table that may be utilized by the Wireless Subscriber Unit of FIG. 6;

FIG. 9 depicts an embodiment of a logical bearer number (LBN) to slot link table that may be utilized by the Wireless Subscriber Unit of FIG. 6;

FIG. 10 depicts an embodiment of a slot to $I_p$ packet number link table that may be utilized by the Wireless Subscriber Unit of FIG. 6;

FIG. 11 depicts an embodiment of a handover link table link table that may be utilized by the Wireless Subscriber Unit of FIG. 6;

Figure 1:
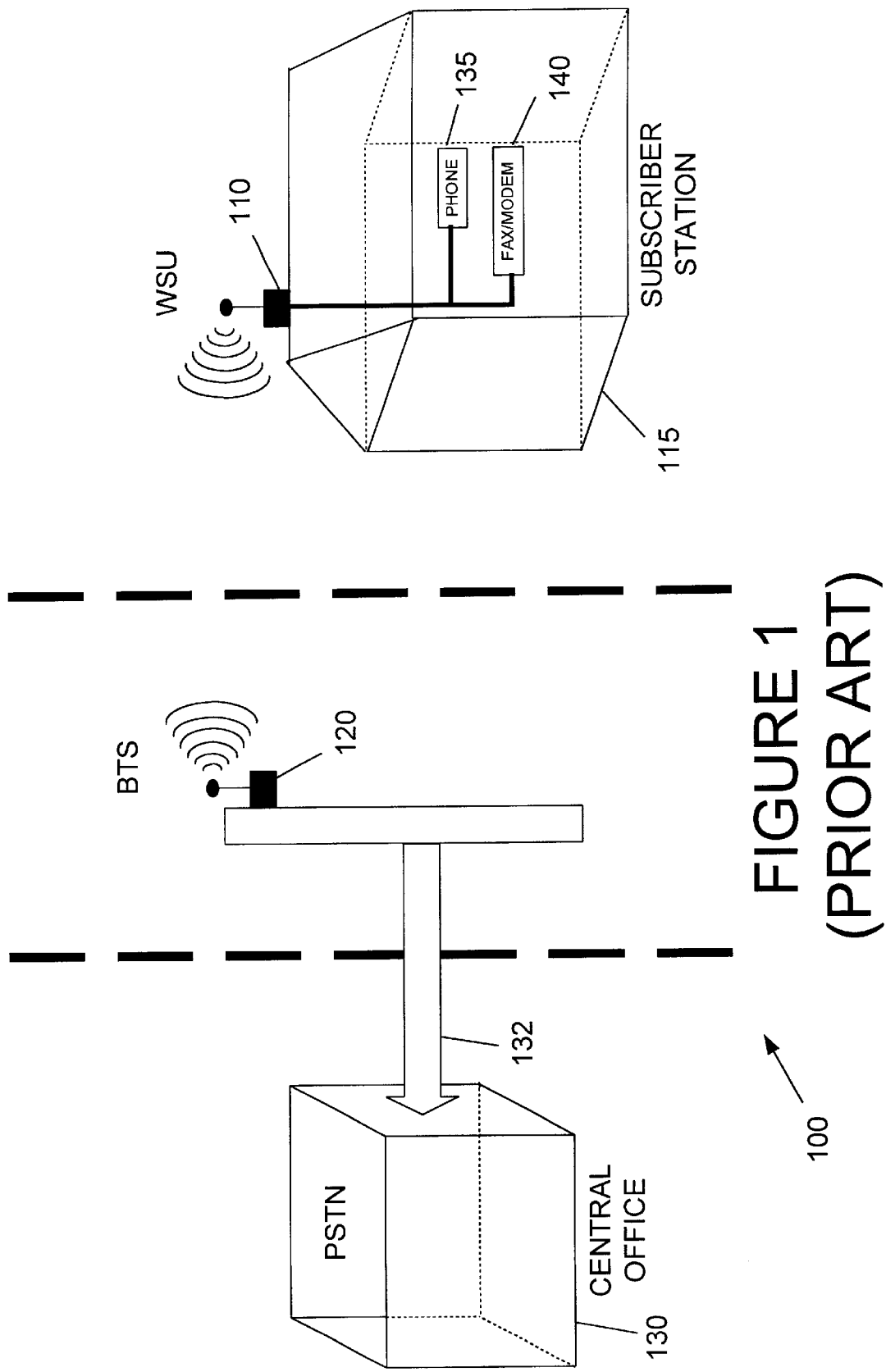
FIG. 1 is a prior art illustration of a stylized block diagram of a WLL network.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 2:
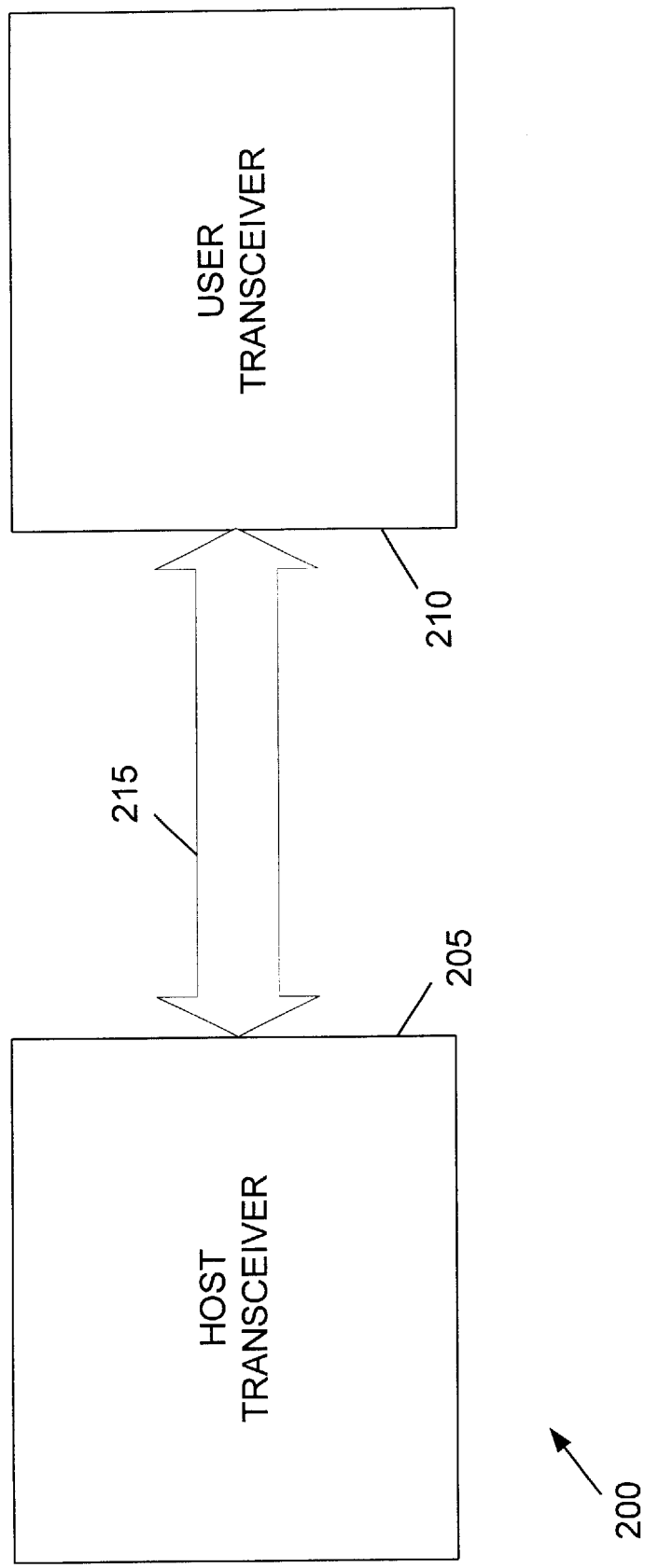
FIG. 2 illustrates a communications system in accordance with the present invention.

Referring now to the drawings, and in particular to FIG. 2, a communications system 200 in accordance with the present invention is illustrated. The communications system 200 includes a host transceiver 205 and a user transceiver 210 capable of communicating with each other over a connection 215. The connection 215 may be either a wire-line connection or a wire-less connection, depending on the application. Generally, the host and user transceiver 205, 210 communicate with each other using a common communications protocol (i.e., a communications standard such as DECT, PHS, NETBIOS, TCP/IP, etc.) that defines the transmission parameters, such as the format of data to be transmitted, error checking algorithm, retransmission scheme, and the like. In one embodiment, the host and user transceivers 205, 210 may be a pair of modems or fax machines. In an alternative embodiment, the host transceiver 205 may be a base station for a cellular telephone network or a WLL network, and the user transceiver 210 may be a cellular telephone of the cellular telephone network or a wireless subscriber unit (WSU) of the WLL network.

Figure 3:
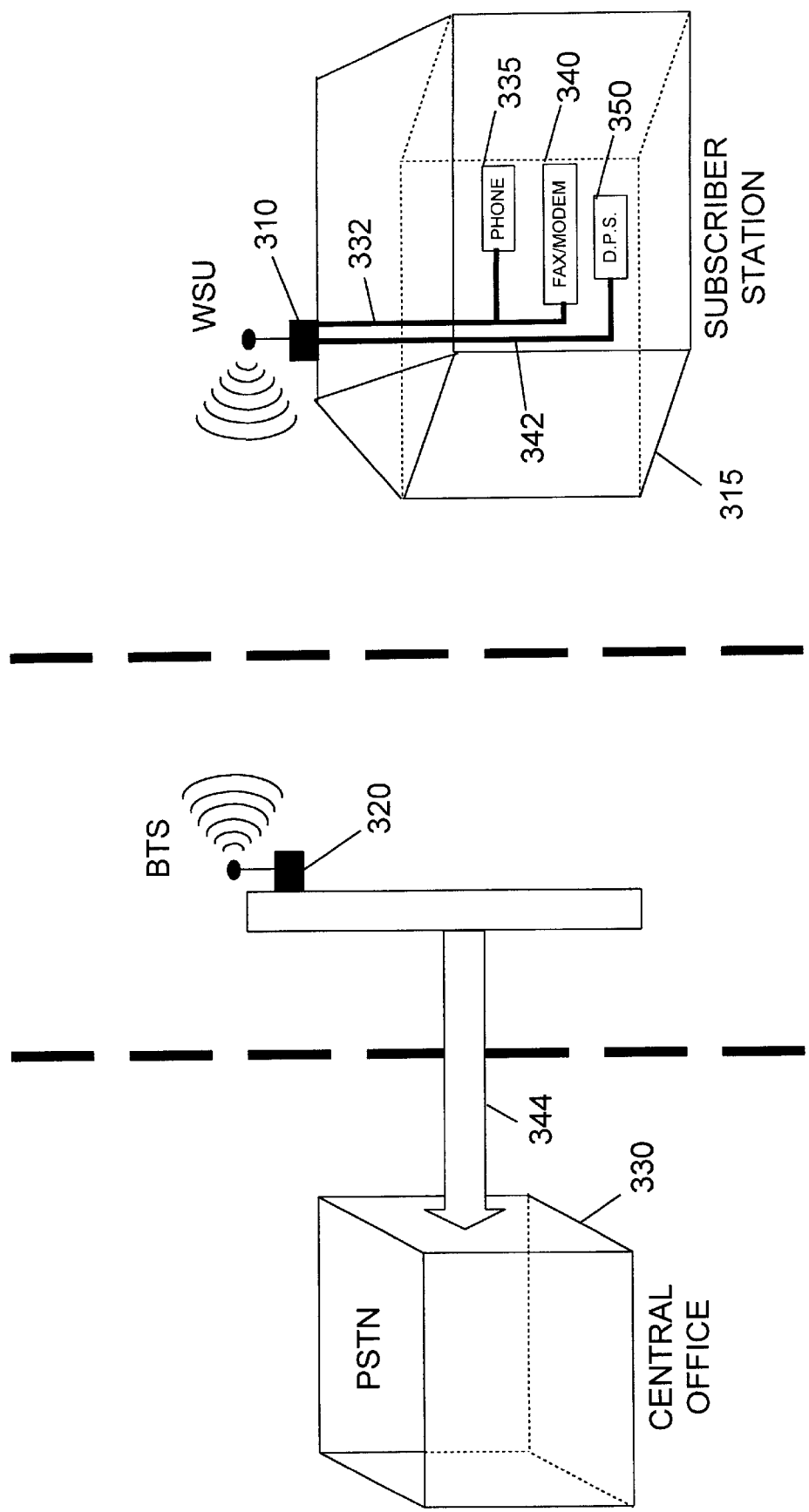
FIG. 3 illustrates a block diagram of a WLL network in accordance with the present invention.

FIG. 3 illustrates a stylized block diagram of an alternative embodiment of a communications system 300 in accordance with the present invention. Specifically, the communications system 300 in the illustrated embodiment is a WLL network 300, where the user transceiver 210 is a Wireless Subscriber Unit (WSU) 310 located at a subscriber station 315, and the host transceiver 205 is a remote Basestation Transceiver System (BTS) 320. The BTS 320 links the WSU 310 to a central office 330, thus allowing a user at the subscriber station 315 to communicate with other subscriber stations (not shown) through the central office 330. In the illustrated embodiment, the WSU 310 is capable of supporting voice and/or data communications. Specifically, the WSU 310 supports a single analog line 332 for a telephone 335 or a modem 340 to use, as well as a data line 342 for providing packet switched data access to a data processing system 350. In some cases the data line 342 can be removed and data can be modulated to share the same line 332 as that used for voice. This requires a specialized data modem (not shown) within the WSU 310 and data processing system 350. A connection 344 between the BTS 320 and the central office 330 may be made via a wire-line, fiber or microwave link, depending on the bandwidth, distance, and the terrain.

One popular WLL protocol is the DECT protocol, which is based on a micro-cellular radio communication system that provides low-power radio (cordless) access, at least as it pertains to the WLL network 300, between the WSU 310 and the BTS 320 at ranges up to a few hundred meters. The DECT protocol is described in the European Telecommunications Standard, ETS 300 175 (Parts 1 through 9) (1996), entitled "Radio Equipment and Systems (RES); Digital Enhanced Cordless Telecommunications (DECT); Common Interface (CI)," which is incorporated herein by reference in its entirety. Other pertinent DECT protocol references include ETR 185, entitled "Radio Equipment and Systems (RES); Digital European Cordless Telecommunications (DECT); Data Services Profile (DSP); Profiles Overview"; ETS 300 765-1, ETS 300 765-2, entitled "Radio Equipment and Systems (RES); Digital European Cordless Telecommunications (DECT); Radio in the Local Loop (RLL) Access Profile (RAP); Part 1: Basic telephony services"; ETS 300 765-2, entitled "Radio Equipment and Systems (RES); Digital European Cordless Telecommunications (DECT); Radio in the Local Loop (RLL) Access Profile (RAP); Part 2: Advanced telephony services"; Draft EN (reference number not yet assigned), V0.0.1 (1998-11), entitled "Digital European Cordless Telecommunications (DECT); Data Services Profile (DSP); DECT Packet"; EN 300 435, entitled "Radio Services (DPRS) Digital European Cordless Telecommunications (DECT); Data Services Profile (DSP); Base standard including inter-working to connection-less networks (Service types A and B, class 1)"; and EN 300 651, entitled "Digital European Cordless Telecommunications (DECT); Data Services Profile (DSP); Generic data link service (service type C, class 2)," which are incorporated herein by reference in their entirety. Exemplary technical characteristics of the DECT protocol are shown below in Table 1.

TABLE 1

Technical Characteristics for DECT protocol

| | |
|---|---|
| Frequency Band | 1880–1900 MHz |
| Number of Carriers | 10 |
| Carrier Spacing | 1.728 MHz |
| Peak Transmit Power | 250 mW |

TABLE 1-continued

Technical Characteristics for DECT protocol

| | |
|---|---|
| Carrier Multiplex | TDMA; 24 slots per frame |
| Frame Length | 10 ms |
| Basic Duplexing | TDD using 2 slots on same RF carrier |
| Gross Bit Rate | 1152 kbit/sec |
| Net Channel Rates | 32 kbit/sec B-field (traffic) per slot |
| Packet Data (effective bit rate) | 552 kbit/sec |

Figure 4A:
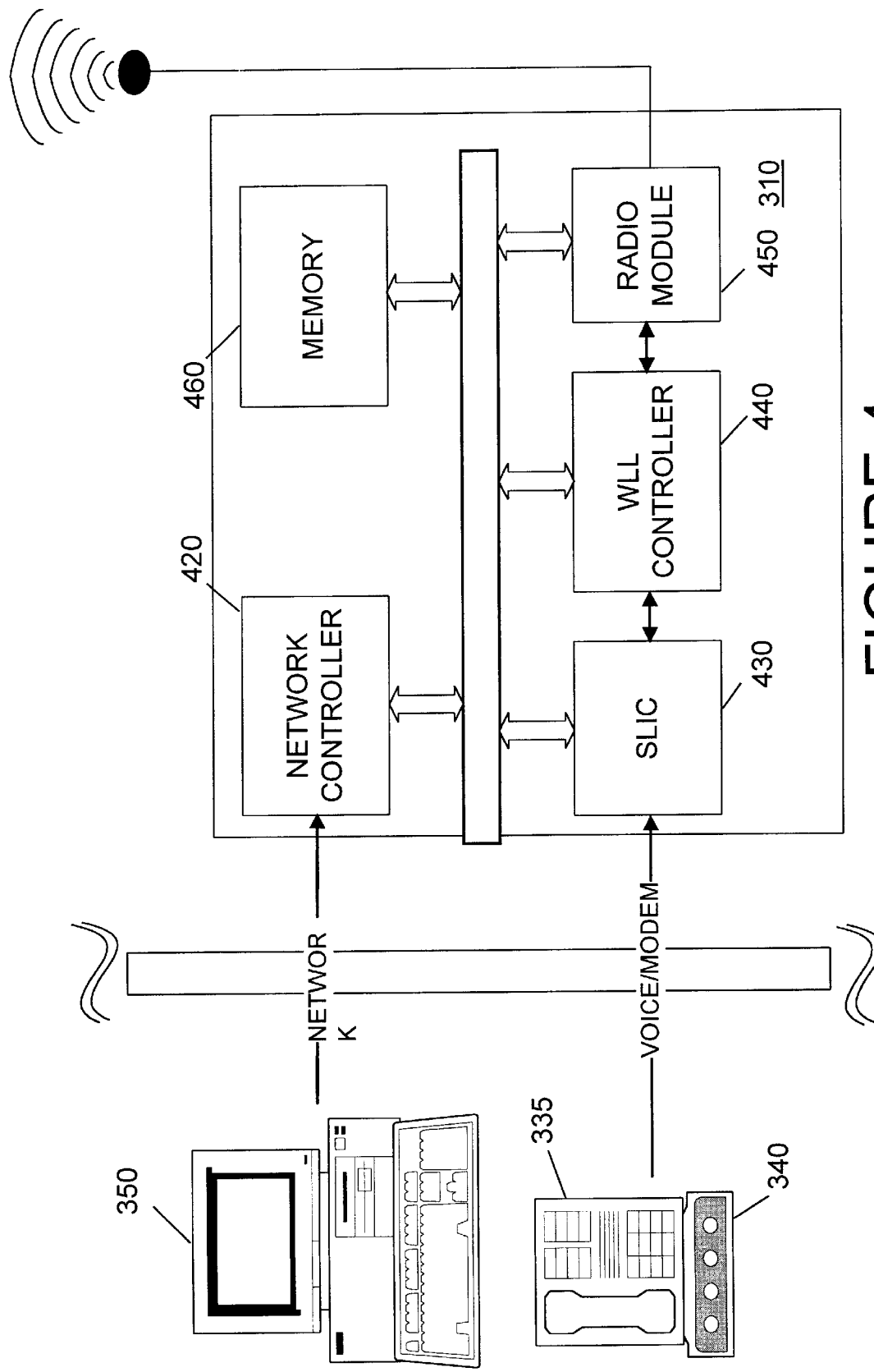
FIG. 4a depicts a Wireless Subscriber Unit of the WLL network of FIG. 3 in accordance with the present invention.

FIG. 4a illustrates a stylized block diagram of one embodiment of the WSU 310 in accordance with the present invention. The data processing system 350, the phone 335, and the modem 340 provide packet data, voice data, and modem data, respectively, to the WSU 310, which then transmits the data to the BTS 320. The data processing system 350 is capable of providing packet data to a network controller (i.e., more generally referred to as data controller) 420 of the WSU 310 through a network card (not shown), such as a token ring card, an Ethernet card, a PCnet card, and the like. A Subscriber Line Interface Circuit (SLIC) 430 of the WSU 310 provides the voice/modem 335, 340 interface. A WLL controller 440 formats the packet, voice, and modem data according to the DECT protocol and then interfaces to a radio module 450 for transmission and reception. Similarly, the WLL controller 440 is also responsible for processing received DECT frames, decoding and storing protocol messages, and directing the user information to an appropriate destination.

The packet data is provided by the data processing system 350 to the network controller 420, which formats the packet data into smaller sized protocol data units (PDUs) and stores the PDUs in an external memory 460 of the WSU 310. The external memory 460 acts as a buffer to the WLL controller 440 because the WLL controller 440 is generally unable to transmit the packet data at the rate the data is provided to the WLL controller 440 by the data processing unit 350. Accordingly, the PDUs are stored in the external memory 460 by the network controller 420, and later retrieved by the WLL controller 440 for transmission on an as needed basis.

Figure 4B:
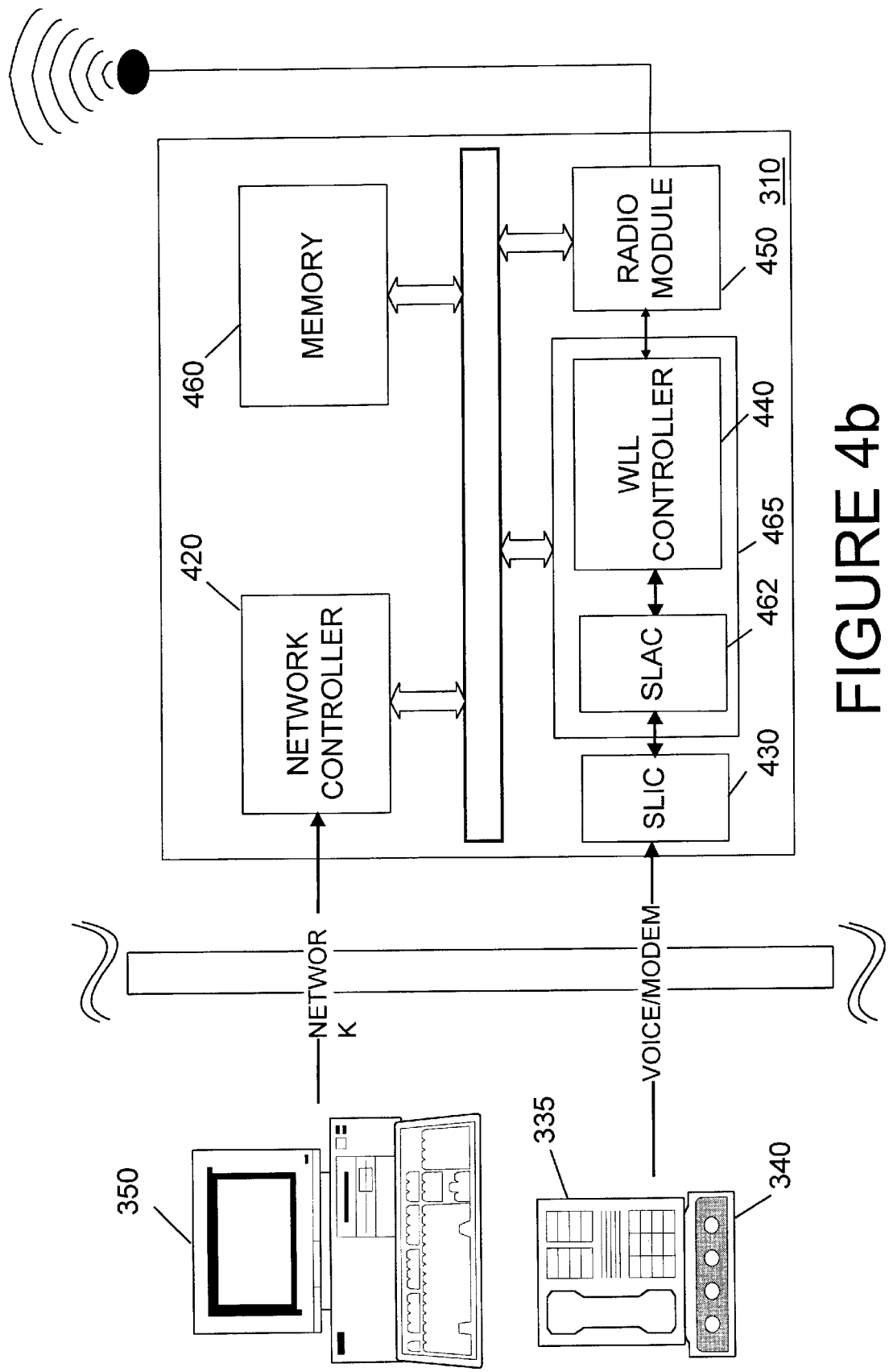
FIG. 4b depicts an alternative embodiment of a Wireless Subscriber Unit of the WLL network of FIG. 3 in accordance with the present invention.

FIG. 4b illustrates a stylized block diagram of an alternative embodiment of the WSU 310 in accordance with the present invention. The illustrated embodiment of FIG. 4b includes a subscriber line audio-processing circuit (SLAC) 462 that is capable of supporting most control and maintenance functions required to support a standard tip/ring interface. In the illustrated embodiment, the SLAC 462 and the WLL controller 440 are integrated in one device 465. In one embodiment, the SLAC 462 may be one channel of the Advanced Micro Devices' Advanced Dual SLAC chip (ADSLAC). The use of SLAC 462 in remote applications, such as a WLL system, for example, is useful since many of the central office functions such as ring generation, DTMF decoding, and loop testing may be performed at the user premises, rather than at the central office. The WLL controller 440 communicates with the on chip SLAC 462 through a general circuit interface (GCI) serial port (not shown).

The integration of the SLAC 462 on the same chip 465 as the WLL controller 440 decreases the number of external components required to support the tip/ring interface, thereby lowering the overall system costs. Furthermore, an integrated SLAC 462 can be more readily optimized for WLL technology, as compared to a conventional SLAC marketed for general use. Sometimes it may be cost prohibitive to modify or adapt general purpose SLACs or pre-existing SLACs for use with WLL technology. With an integrated SLAC 462, one can readily include echo suppression functionality, for example, within a WLL controller 440 to achieve a higher attenuation of echo, a functionality that is often desirable in wireless technology. Other features such as tone encoders and decoders (not shown) that monitor progress of calls can also be readily adapted into an integrated SLAC 462 to provide a more robust service for the WLL controller 440.

The DECT protocol currently defines packet data support as standard U-plane service, LU2 class 1 with Medium Access Control (MAC) layer $I_p$ error correction (commonly referred to as MOD2-ARQ). The Data Link Control (DLC) layer U-plane utilizes the $I_p$ channel with the protected mode MAC layer procedure. The protection mode specified is the modulo-2 $I_p$ retransmission scheme for the forward channels and error detection based on the acknowledgement provided by a reverse bearer. There are two types of data bearers, a duplex and double simplex bearer. The flow of data in a duplex bearer slot is bi-directional, while the flow of the data for double simplex bearers is unidirectional.

FIG. 5a illustrates a DECT (TDMA) frame 500 that may be utilized by the present invention. The frame 500 is of a 10 millisecond duration and is divided into 24, grouped as twelve receive and twelve transmit slots. FIG. 5b illustrates one slot 504 of the frame 500. The slot 504 of the frame 500 includes a first guard band 505, an S-field 507, an A-field 509, a B-field 510, an X and Z field 512, 514, and a second guard band 516. FIG. 5c illustrates a more detailed diagram of the B-field 510 that is utilized for transferring packet data in the protected mode. Specifically, the B-field 510 of the frame 500 includes four sub-fields 530(a–d) (hereinafter referred to as "data fields"), wherein a corresponding error detection field 535(a–d) protects each data field 530(a–d). Although not so limited, in the illustrated embodiment, the error detection fields 535(a–d) are Cyclic Redundancy Code (CRC) fields. Cyclic redundancy checking is a method of checking for errors in data that has been transmitted on a communications link. The sending device (i.e., either the WSU 310 or BTU 320) applies a 16- or 32-bit polynomial to each data field 530(a–d) that is to be transmitted and appends the resulting cyclic redundancy code (CRC) to each data field 530(a–d). The receiving end (i.e., either the WSU 310 or BTU 320) applies the same polynomial to the data and compares its result with the result appended by the sender. If they agree, the data within the data fields 530(a–d) has been received successfully. If not, the sender can be notified to retransmit the data. The data fields 530(a–d) hold packet data that is transferred to and from the WSU 310, and the CRC fields 535(a–d) are utilized to determine the integrity of the packet data stored in the data fields 530(a–d). Each data field 530(a–d) in the illustrated embodiment, as defined by the ETSI, comprises 64 bits, and each CRC field 535(a–d) comprises 16 bits. The terms "field" and "data field," as utilized herein, refer to at least a portion of the frame 500, and thus may include one or more bits of the frame 500.

It is contemplated that the present invention is applicable to a variety of communications systems employing TDMA technology. However, for illustrative purposes, the present invention is described with respect to the DECT TDMA frame 500.

The functionality of the WLL controller 440 may be controlled by software, hardware, or any combination thereof. Although not so limited, in the illustrated embodiment, the software handles the higher levels of functionality that include portions of the Medium Access Control (MAC) layer, the Data Link Control (DLC) layer. The software may also perform other control functions for the WLL controller 440, such as defining the modes of operation, ascertaining the slots and frequencies that are to be utilized, and determining the timing configurations for the radio control signals.

The present invention includes implementing certain functions of the WLL controller 440 in hardware, especially functions where real time operation is desirable. For example, and as is described in more detail below, a method of transferring data from the memory 460 to an internal memory of the WLL controller 440 is implemented primarily in hardware to increase the data throughput between the WSU 310 and BTS 320.

Figure 6:
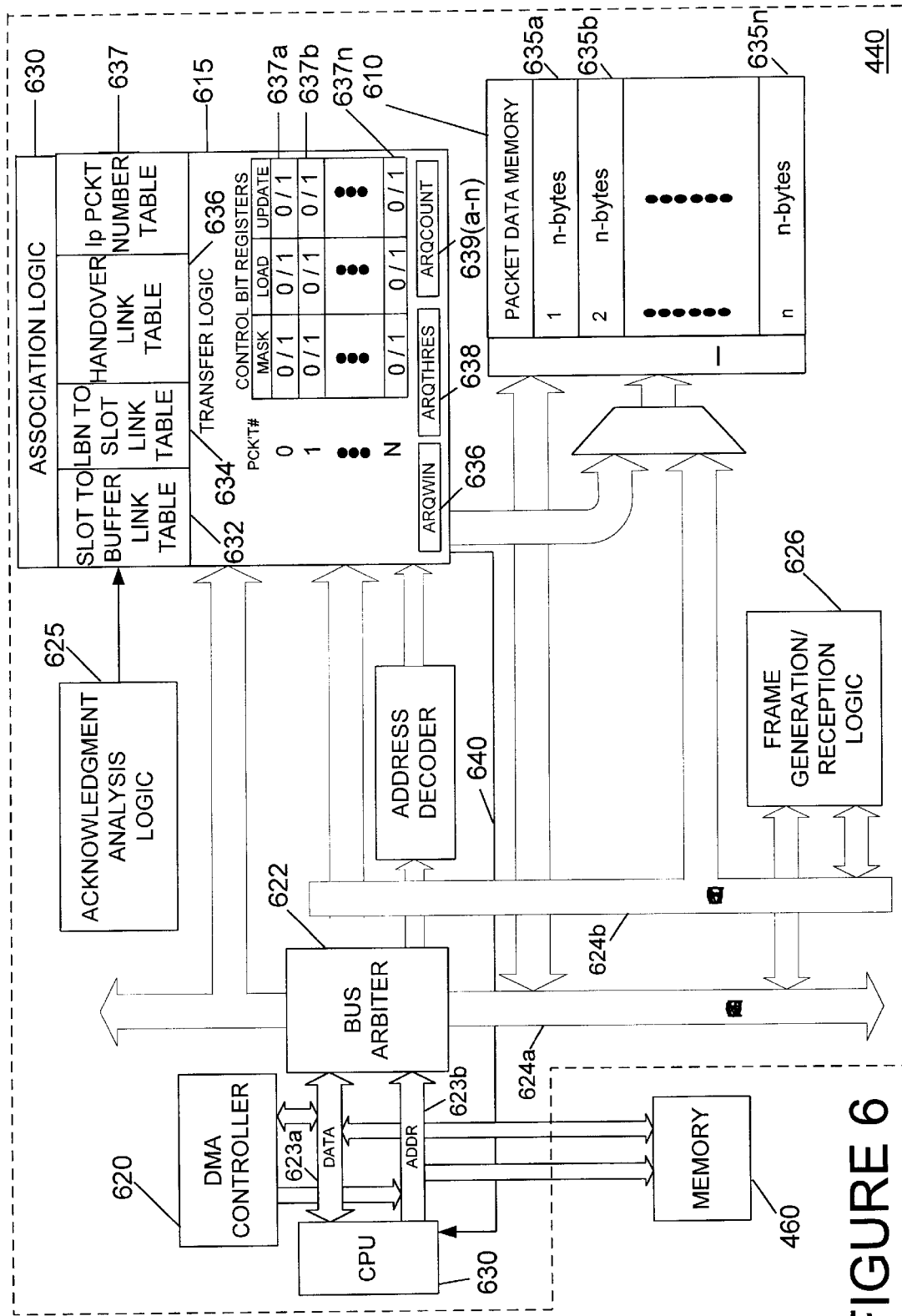
FIG. 6 illustrates a stylized block diagram of the Wireless Subscriber Unit of FIGS. 4a and 4b in accordance with the present invention.

FIG. 6 illustrates a stylized block diagram of the WLL controller 440 in accordance with the present invention. In the interest of clarity and to avoid obscuring the invention, only that portion of the WLL controller 440 that is helpful in understanding the invention is illustrated. More specifically, FIG. 6 illustrates a portion of the WLL controller 440 that may be utilized for transmission and reception of packet data. The WLL controller 440 includes a transfer logic 615, which is capable of moving blocks of data from the external memory 460 to an "on-chip" packet data memory 610 without a need of continuously reprogramming a direct memory access ("DMA") controller 620 by a CPU 630 of the WLL controller 440. The transfer logic 615 accomplishes this transfer by asserting or de-asserting a request on line 640. A bus arbiter 622 is provided to allow both the CPU 630 and the transfer logic 615 via the DMA controller 620 to access the packet data memory 610. The arbiter 622 provides an interface between a CPU data and address buses 623a, 623b to respective global data and address buses 624a, 624b. The WLL controller 440 includes acknowledgement-analysis logic 625 as well as frame generation/reception logic 626. The frame generation/reception logic 626 generates frames 500 using at least a portion of the data stored in the packet data memory 610 and transmits the frames 500 to the peer station. The frame generation/reception logic 626 extracts and stores data in the packet data memory 610 from the frames 500 that are received from the peer station.

Figures 7A, 7B, 7C:
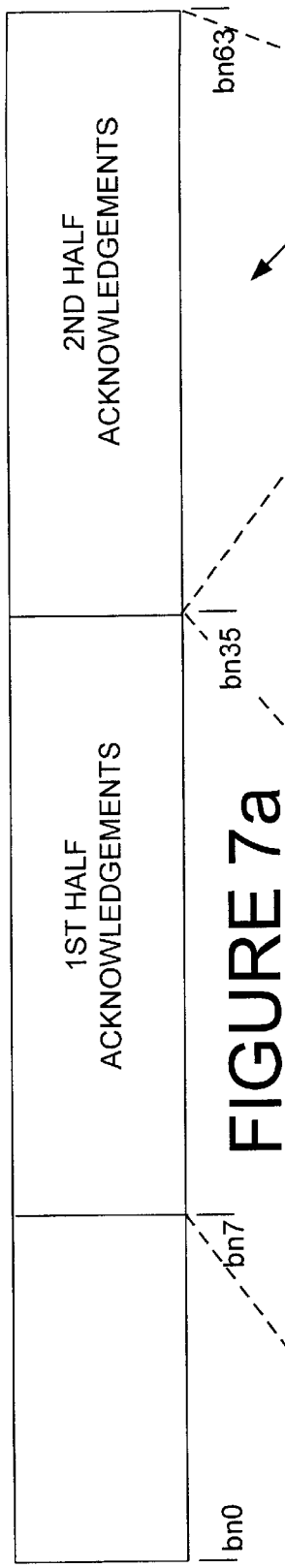
FIGS. 7a–c illustrate a portion of the DECT frame of FIG. 5a that includes the acknowledgements from the reverse bearer.

Generally, each frame 500 transmitted from the peer station includes an acknowledgement of an earlier transmission by the WSU 310. The acknowledgement-analysis logic 625 of the WLL controller 440 analyzes acknowledgements transmitted by the peer station. Acknowledgements are received in an active packet data receive slot (i.e., a reverse bearer) of the frame 500. Acknowledgements for double simplex bearers are received in a MAC-MOD2-ACK message, on a logic bearer number (LBN) basis. Specifically, the acknowledgements for double simplex bearers reside in at least one of the data fields of B-field 510 of the frame 500, as shown in FIG. 7a. The acknowledgement for the duplex bearers is received in the A-field 509 (see FIG. 5b) of the frame. As will be described in more detail below, the acknowledgement-analysis logic 625 utilizes association logic 630, which, in one embodiment, comprises at least one of slot to buffer link table 632, LBN to slot link table 634, holdover link table 636, and slot to $I_p$ packet number link table 637 to analyze acknowledgements transmitted by the peer station. In accordance with present invention, the WLL controller 440 utilizes the association logic 630 to quickly and efficiently analyze the acknowledgements and to prioritize the transmission of data such that bandwidth is preserved.

As can be seen in FIG. 7a, the MAC-MOD2-ACK messages for the double simplex bearers may occupy at least one of the data fields of the B-field 510 of the frame 500 (i.e., bits 8 through 63 of a data field). A double simplex bearer comprises two bearers. The two bearers are typically 12 slots apart (e.g., $1^{st}$ and $13^{th}$ slots), and share a common LBN. However, despite having a common LBN, each bearer of the double simplex bearer has its own acknowledgement. The acknowledgement of the first bearer of a double simplex bearer is received in the first portion of one of the data fields 530(*a–d*), as shown in FIG. 7*b*. The acknowledgement of the second bearer of a double simplex bearer is received in the second portion of one of the data fields 530(*a–d*), as shown in FIG. 7*c*.

Referring back to FIG. 6, the transfer logic 615 is capable of transferring data from the external memory 460 to an "on-chip" memory (hereinafter referred to as "packet data memory") 610 of the WLL controller 440. Specifically, transfer logic 615 is capable of moving blocks of data from the external memory 460 to an "on-chip" packet data memory 610 without a need of continuously reprogramming a direct memory access ("DMA") controller 620 by a CPU 630 of the WLL controller 440. The data transfer is initiated/terminated by asserting/de-asserting a request on the line 640. Once the data is transferred from the external memory 460 to the packet data memory 610, the data stored in the packet data memory 610 is transferred to the radio module 450 for transmission to its counterpart, the BTS 320 (see FIG. 3). The description hereinafter relates to transmission of data in an uplink connection (i.e., transfer from the WSU 310 to BTS 320), however, it is contemplated that the present invention is equally applicable in a downlink connection (i.e., transfer from the BTS 320 to the WSU 310).

The DECT retransmission scheme for the packet data transmission sometimes requires that a variable amount of data be moved from the external memory 460 to the packet data memory 610. This is due to the fact that data from earlier frames 500 may occasionally need to be retained in the packet data memory 610 for retransmission and thus cannot be overwritten by new data. The transfer logic 615 is capable of determining the amount of new data that is required for every frame from the external memory 460, initiating the transfer from the external memory 460 to the packet data memory 610 by asserting a DRQ signal on the line 640 using the DMA controller 620, and then terminating the DMA transfer by de-asserting a DRQ signal on the line 640. The transfer logic 615 generates the local packet data address for storage of the data during the transfer as described in detail below.

The packet data memory 610 can be any of a variety of single-ported or multi-ported memory known to the art, including static random access memory (SRAM), dynamic random access memory (DRAM), flash, or any other programmable memory. In the illustrated embodiment, the packet data memory 610 is a dual-port memory comprising a plurality of buffers 635(*a–n*). It is contemplated that the size and type of the memory 610 employed may vary from one implementation to another. A dual-port memory 610 allows a simultaneous read and write access to the packet data memory 610. The buffers 635(*a–n*) of the packet data memory 610 are utilized to store data that is transmitted, as well as for data that is received. In this particular implementation, the packet data memory 610 includes twenty-four 32-byte buffers that correspond to the number of time slots 504 of the DECT frame 500 and the amount of user data carried in each slot 504. Thus, there is a corresponding buffer 635(*a–n*) for each time slot 504. It should be noted that although there is a one-for-one correspondence of slots 504 to buffers 635(*a–n*), a slot 504 can be assigned to any one of the buffers 635(*a–n*). The software, in one embodiment, identifies the buffers 635(*a–n*) that will be utilized for transmission/reception of packet data. As will be described below, the slot to buffer link table 632 may serve a multitude of purposes, including tracking the buffers 635(*a–n*) to slots 504 association.

The transfer logic 615 of the WLL controller 440 includes a plurality of control bit registers 637(*a–n*), wherein each buffer 635(*a–n*) of the packet data memory 610 has a corresponding control bit register 637(*a–n*). Each control bit register 637(*a–n*) comprises a plurality of control bits for configuring the packet data memory 610. Although the present invention employs a control bit register 637(*a–n*) in conjunction with control bits to configure the packet data memory 610, it is contemplated that other means may also be employed to configure the packet data memory 610.

Those skilled in the art will appreciate that the number and type of control bits employed is implementation specific. In the illustrated embodiment, a mask bit, a load bit, and an update bit are utilized. Mask bits identify the buffers 635(*a–n*) of the packet data memory 610 that will be utilized for data transfer. For example, if the mask bits of the first and second control bit registers 637*a*, 637*b* are set to zero, and the mask bits for the remaining control bit registers 637(*c–n*) are set to one, then only the first and second buffers 635*a*, 635*b* of the packet data memory 610 are utilized to transfer data. Accordingly, only the first and second buffers 635*a*, 635*b* of the packet data memory 610 are employed to store data that is retrieved from the external memory 460 for transmission. It should be noted that the software may utilize the unmasked buffers 635(*a–n*) to store and then transmit data other than packet data. In the illustrated embodiment, the mask bits allow the size of the packet data memory 610 that is employed to transmit data to be configurable, as well as allow the buffers 635(*a–n*) to be non-contiguous. The load bits identify which "masked" buffers 635(*a–n*) (i.e., buffers having the mask bit set to zero) of the packet data memory 610 require new data. For instance, referring to the above example, if the load bits of the first and second buffers 635*a*, 635*b* are one and zero, respectively, then only the second buffer 635*b* requires new data. In the illustrated embodiment, the load bits allow the transfer logic 615 to fetch a variable amount of data from the external memory 460 without the intervention of the CPU 630, as described in more detail below. The update bits identify the buffers 635(*a–n*) from which the data has been extracted and transmitted to the BTS 320.

As mentioned earlier, the acknowledgements for double simplex bearers are received in a logic bearer number (LBN) format. However, data is transmitted and received on a slot-by-slot basis, wherein each slot has at least one corresponding buffer 635(*a–n*). Accordingly, it is desirable for the acknowledgement-analysis logic 625 to match each LBN acknowledgement to its corresponding slot to determine which buffer or buffers 635(*a–n*) need updating. The acknowledgement-analysis logic 625 analyzes the bearer acknowledgement and then, based on the results of an earlier transmission, updates the load bit in the control bit registers 637(*a–n*). The acknowledgement-analysis logic 625 utilizes the LBN to slot link table 634 to ascertain a corresponding slot 504 for each LBN. The slot to buffer link table 632 is then utilized to associate each slot 504 to a corresponding buffer 635(*a–n*) in the packet data memory 610. The association of slot 504 to a particular buffer 635(*a–n*) is desirable to allow the acknowledgement-analysis logic 625 to update the load bit in the control bit registers 637(*a–n*).

FIG. 8 illustrates one embodiment of the slot to buffer link table 632. Although not so limited, the slot to buffer link table 632 includes at least one field for each slot 504 of the frame 500. Each "slot" field has three corresponding fields: packet data active field, carrier type field, and packet data buffer field. The "packet data active" field identifies whether the corresponding slot 504 is being utilized for transmission of packet data. The acknowledgement field of the reverse bearer does not identify the active LBNs and, so, the "packet data active" field of the slot to buffer link table 632 provides a quick and efficient means for ascertaining the LBNs that are active. The "packet data active" field, for example, may include a binary digit 1 or 0 to indicate whether the corresponding slot is being utilized for transmitting packet data. The "carrier type" field identifies the type of carrier associated with that slot 504, such as a full duplex bearer, double simplex bearer, and the like. The "packet data buffer" field of each slot 504 identifies the buffer 635($a$–$n$) that is associated with that particular slot 504. The "packet data buffer" includes at least a portion of the memory address of each buffer 635($a$–$n$) to identify the buffer 635($a$–$n$). It should be noted that when processing a reverse bearer, which occurs between slots 0 and 11, that the transmit portion of the duplex bearer will be 12 slot offset. For example, if a duplex reverse bearer is on slot 5, then the transmitting portion of the duplex bearer will be on slot 17 (i.e., 5+12).

The slot to buffer link table 632 is generally initialized before the communication between the WSU 310 and BTS 320 commences. That is, the slot to buffer link table 632 is updated once the WLL controller 440 of the WSU 310 ascertains the slots 504 and frequencies that will be utilized during communications with the BTS 320. Accordingly, the number of slots 504 that are dedicated for transmitting packet data will determine, at least initially, the number of packet data buffers 635($a$–$n$) that need to be allocated. Additional buffers 635($a$–$n$) may be allocated during bearer handover.

FIG. 9 illustrates one embodiment of the LBN to slot link table 634, which allows for a quick and efficient method for associating each LBN to a corresponding slot 504 of the frame 500. The association of LBNs to the corresponding slots 504 is desirable because the acknowledgement received from the peer station is based on an LBN basis, and not slot basis. Accordingly, in accordance with the present invention, the LBN to slot link table 634 provides a quick and efficient method for converting LBNs to slot values. Although not so limited, the LBN to slot table link table 634 illustrated in FIG. 9 includes fourteen LBN fields for the first and second half of the frame 500. Each LBN field has a corresponding slot number. Those skilled in the art will appreciate that the LBN to slot link table 634 may contain additional entries or fields without departing from the spirit of the invention. Additionally, the number of LBN fields in the LBN to slot link table 634 may vary depending on the application.

In one embodiment of the present invention, the LBN to slot link table 634 is automatically updated every time the slot to buffer link table 632 is revised. That is, the LBN to slot link table 634 acts similar to a shadow register in that it monitors the bus and extracts, formats, and organizes information from the bus in a manner that requires little intervention from the software.

The $I_p$ retransmission scheme utilizes a two-state packet number scheme, wherein the packet number toggles between 1 and 0 for successive new packets. The packet number does not change in case of an unsuccessful retransmission. In the illustrated embodiment, although not so limited, the $I_p$ packet numbers are maintained in slot to $I_p$ packet number link table 637 on a slot basis for both uplink and downlink connections. One embodiment of the slot to Ip packet number link table 637 is illustrated in FIG. 10. One bit is provided in the slot to Ip packet number link table 637 for each slot 504, where the bit represents the current packet number for the bearer associated with that slot 504. The slot to Ip packet number link table 637 may be accessed by the software.

Generally, a packet data connection consists of multiple bearers. When errors are detected in a particular bearer, a decision may be made to move the bearer to a different slot 504. This can be accomplished using bearer handover or bearer replacement. In both situations, the data in a particular packet data is transmitted for a period of time on two slots 504. In the case of bearer replacement, data in one buffer 635($a$–$n$) is transmitted on two slots 504, each with a different LBN. When the acknowledgement is received, a common decision is made which considers both LBN acknowledgements. The LBN to slot link table and slot to buffer link table 632, 634 are used to identify the common buffer 635($a$–$n$) and hardware updates the load bit. In the case of handover, a second slot 504 is set up to transmit the same data on two slots 504, but this is considered to be the same bearer and has the same LBN. The same data is transmitted on two slots 504, and therefore, although the same bearer, separate variables are maintained for each slot 504. The requirement is that based upon the LBN acknowledgement received and current status of the bearer, the hardware will decide to advance, retransmit, or jump. Since both slots are really the same bearer, they must also have the same packet number which is maintained on a slot by slot basis. The slot to Ip packet number link table 637 and handover link table 636 are used to perform a common update of this variable during handover. The handover link register table defines the primary slot, handover slot, and a bit which indicates an handover is in progress.

In accordance with the present invention, the transfer logic 615 of the WLL controller 440 is capable of transferring data from the external memory 460 to the packet data memory 610 without the real-time intervention of the central processing unit 630. The WLL controller 440 employs a method of FIG. 12 to accomplish the data transfer from the external memory 460 to the packet data memory 610. The method of FIG. 12 begins at block 710, where the control bit registers 637($a$–$n$) and the DMA controller 620 are initialized. The initialization process is illustrated in FIG. 13. At block 810, the control bit registers 637($a$–$n$) are initialized by setting the mask bits of the buffers 635($a$–$n$) of the packet data memory 610 that are to be utilized for the packet data asymmetric connection to zero. At the block 820, the load bits for the unmasked buffers 635($a$–$n$) are set to zero to indicate that the unmasked buffers 635($a$–$n$) need new data, and the update bits are set a value of one to indicate that the contents of the unmasked buffers 635($a$–$n$) have not yet been extracted and transmitted to the BTS 320. At block 830, the source address pointer of the DMA controller 620 is programmed to point to the relevant address in the external memory 460. The source address pointer of the DMA controller 620 is programmed to increment following every transfer. At block 840, the destination address pointer of the DMA controller 620 is programmed to point to a transfer logic register 615 that specifies a starting location for storing data in the packet data memory 610. The destination address pointer of the DMA controller 620 is programmed such that it does not increment following every transfer.

Referring back to FIG. 12, after the initialization process of the block 710 is complete, at block 720, the transfer logic 615 determines the 32-byte boundaries (starting with the initial address) of the buffers 635(a–n) of the packet data memory 610. The boundaries are identified by the transfer logic 615 for two primary reasons: First, to determine if a buffer (32-byte segment) 635(a–n) needs to be skipped while data is being transferred from the external memory 460. A buffer 635(a–n) is skipped if either its corresponding mask or load bit is set to one. Second, to determine if a buffer pointer has wrapped around (i.e., the buffer pointer is past the last unmasked buffer 635(a–n)). The transfer logic 615 ensures that the buffer pointer points to the next unmasked buffer 635(a–n) that is available for storing data.

At block 730, the arrival of a reverse bearer is detected. A reverse bearer, in an uplink connection, for example, generally provides an acknowledgement to the WSU 310 from the BTS 320, indicating whether the transmission was successful or not. In response to detecting the reverse bearer, at block 740, an acknowledgement analysis is performed on a slot-by-slot basis of the data transmitted during an earlier frame. That is, as per DECT protocol, the reverse bearer from the BTS 320 provides an acknowledgement of an earlier transmission, wherein the reverse bearer indicates, on a slot-by-slot basis, which data successfully reached the BTS 320. Because it is necessary to perform the acknowledgement analysis of the block 740 for only those buffers 635(a–n) for which the data was transmitted, the acknowledgement data for only those buffers 635(a–n) having an update bit equal to zero are analyzed. During the acknowledgement analysis at the block 740, the buffers 635(a–n) whose mask bits are equal to zero and whose update bits are equal to zero are identified. The load bits for these identified buffers 635(a–n) are set to zero, if the corresponding transmission was successful. Accordingly, if the transmission was successful for unmasked buffers 635(a–n) having an update bit of zero, then the corresponding load bits of these buffers 635(a–n) are set to zero, indicating that these buffers 635 (a–n) need new data.

In certain instances, the data transmission may be unsuccessful. In these instances, the transfer logic 615 utilizes registers ARQWIN, ARQTHRES, and ARQCOUNT 636, 638, 639(a–n) to manage the lifetime (e.g., number of retransmissions allowed) of the data stored in buffers 635 (a–n). ARQWIN register 636 may be a programmable register that can be set by software to define the maximum number of retransmissions allowed for data stored in the unmasked buffers. ARQTHRES register 638, which can also be a software programmable register, is utilized to specify an ARQ count threshold value. When an ARQCOUNT register 639(a–n) reaches the threshold value specified in ARQTHRES register 638, an interrupt is generated. For example, if the ARQWIN register 636 is programmed to 5 and the ARQTHRES register 638 is set to 2, an interrupt is generated when ARQCOUNT register 639(a–r) reaches 2, indicating that there have been 3 transmissions (the initial transmission, plus two retransmissions) of the same data. Upon the generation of the interrupt, the software can perform a variety of administrative tasks, including but not limited to re-assigning another bearer to transmit the data that was unsuccessfully transmitted. Accordingly, software via the ARQTHRES register 638 may attempt to transmit data on a variety of bearers before the maximum number of retransmission value stored in the ARQWIN register 636 is reached. The ARQCOUNT register 639(a–n) tracks the number of transmissions of data stored in the corresponding buffer 635(a–n). In one embodiment, the value in ARQCOUNT register 639(a–n) for each buffer 635(a–n) is set to the value stored in ARQWIN register 636 and then decremented for each unsuccessful transfer. When the value stored in ARQCOUNT register 639(a–n) reaches zero, the update bit for the buffer 635(a–n) corresponding to the ARQCOUNT register 639(a–n) is set to zero so that new data may be loaded during the next transfer. Accordingly, through the use of the ARQWIN, ARQTHRES, and ARQCOUNT registers 636, 638, 639(a–n), the transfer logic 615 manages the lifetime of data stored within the buffers 635(a–n).

At block 745, the transfer logic 615 determines if at least one buffer 635(a–n) is available for receiving data. That is, the transfer logic 615 searches the packet data memory 610 and identifies an unmasked buffer 635(a–n) having an associated load bit equal to zero. If at least one buffer 635(a–n) is available, then, at block 750, the transfer logic 615 begins to transfer the new data from the external source to the available buffers 635(a–n). If no buffer 635(a–n) is available to receive the new data (i.e., all the buffers are full), then the step of block 750 is skipped. As will be described in more detail below, the transfer logic 615 initiates a DMA transfer from the external memory 460 by asserting a data request on the line 640. Once the buffers 635(a–n) are loaded with new data, at block 760, the WILL controller 440 of the WSU 310 transmits the data to the BTS 320.

At the block 750, the transfer logic 615 initiates a DMA transfer substantially immediately following the reception and processing of a reverse bearer, provided that at least one of the buffers 635(a–n) is free to receive new data. In accordance with the present invention, the transfer logic 615 transfers data from the external memory 460 to the packet data memory 610 based on a priority scheme. That is, as is described in more detail in FIG. 14, the priority scheme, in one embodiment, calls for retrieving data into buffers based on the order the slots 504 are transmitted within a frame 500. For example, assuming the acknowledgement is received on a reverse bearer in slot 5, the transfer logic 615 starts from slot 6 to see if the buffer 635(a–n) corresponding to slot 6 needs to be loaded with new data. If yes, the buffer 635(a–n) corresponding to slot 6 is loaded with new data. If not, the next slot (i.e., slot 7) is checked. The above process continues for the remaining slots 504 of the frame 500 until all of the slots 504 up to the reverse bearer slot have been checked.

Figure 14:
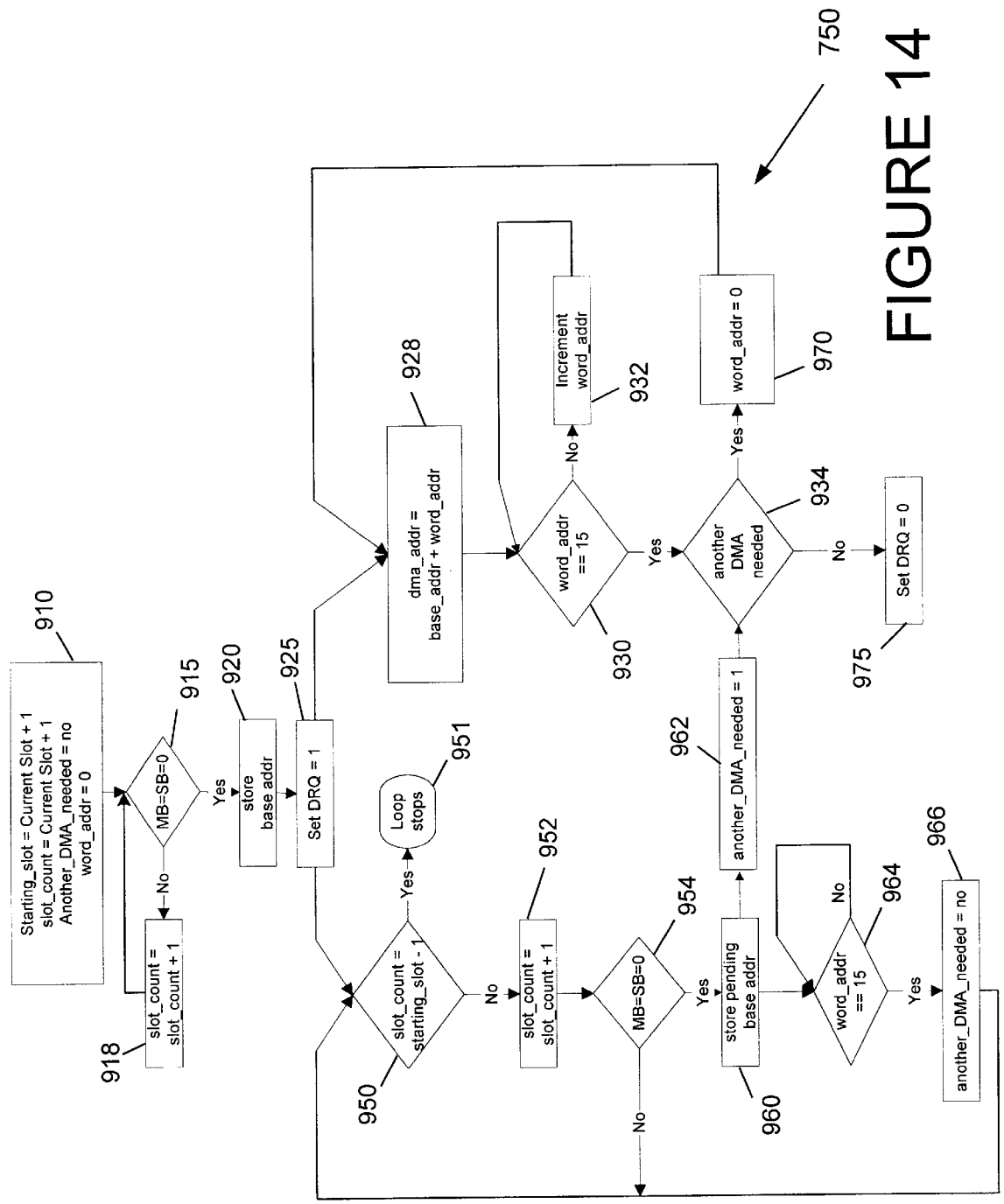
FIG. 14 illustrates a method in accordance with the present invention that can be employed by the Wireless Subscriber Unit illustrated in FIG. 6.

At block 910 of FIG. 14, several variables are initialized, such as "starting_slot," "slot_count," "another_DMA_ needed," and "word_addr." The starting slot variable is utilized as a reference point to identify when all of the buffers 635(a–n) corresponding to the slots 504 of the frame 500 have been analyzed. The slot_count variable is utilized as a pointer to step through the slots 504 of the frame 500 until the slot 504 identified by the starting_slot variable (i.e., reverse bearer slot) has been reached. Initially, the starting_slot and slot_count variables point to the next slot 504 after the reverse bearer slot 504. The another_DMA_ needed variable is used as a flag to indicate whether a buffer 635(a–n) of the packet data memory 610 needs new data. The word_addr variable is utilized as a counter to ensure that a particular buffer 635(a–n) has been completely loaded. In the illustrated embodiment, although not so limited, because of the size of each buffer 635(a–n) is 32 bytes, the word_addr is reset after 16 iterations.

At block 915, the transfer logic 615 analyzes the mask and load bits of the buffer 635(a–n) corresponding to the slot 504 identified by the slot_count variable (hereinafter also referred to as the "current buffer"). At the block 915, the slot_count variable points to the slot 504 after the reverse bearer slot (i.e., see block 910). The transfer logic 615 utilizes the slot to buffer link table 632 to associate slots 504 to corresponding buffers 635(a–n). If at the block 915 the mask and load bits of the buffer 635(a–n) corresponding to the slot 504 identified by the slot count variable are not zero, then the slot count variable is incremented to point to the next slot 504. A mask bit of a zero indicates that the corresponding buffer 635(a–n) of the packet data memory 610 is being utilized to transfer data, and a load bit of zero indicates that the corresponding buffer 635(a–n) needs to be loaded with new data. Thus, if both mask and load bits of a buffer 635(a–n) are zero, then, at the block 910, additional data must be retrieved and stored in the buffer 635(a–n). On the other hand, if both the mask and load bits are not equal to zero, then, at block 915, either the buffer 635(a–n) is masked off or the buffer 635(a–n) contains data that has not been acknowledged. Accordingly, if the mask bit and load bits of a buffer 635(a–n) are not equal to zero, then that buffer 635(a–n) needs no servicing and the slot_count variable is incremented until a slot 504 is found that has a corresponding buffer 635(a–n) that needs new data. Once the buffer 635(a–n) is found having a mask and load bits of zero, at block 920, at least a portion of the address of the buffer 635(a–n) is stored in a register (not shown) for later use.

At block 925, a DRQ on the line 640 is asserted and two separate, yet substantially simultaneous, processes are spawned off. The first process handles a direct memory access request for a current buffer 635(a–n), while the second process searches for a next buffer 635(a–n) that needs servicing (e.g., needing new data). The second process is able to search for the next buffer 635(a–n) needing service because the second process operates faster than the first process. This is because the actual act of transferring data that occurs during the first process generally tends to be slower than the operations performed in the second process.

The steps of the first process are performed by blocks 928, 930, and 932. At the blocks 928, 930, and 932, the transfer logic 615 transfers new data from the external memory 460 to the buffer 635(a–n) referenced by the slot_count. At the block 928, the address for the DMA controller 620 is generated by the transfer logic 615 by adding the base address of the current buffer 635(a–n) plus an offset specified by the word_addr variable. As indicated by the blocks 930 and 932, the DMA controller 620 for the current buffer 635(a–n) cycles through 16 different address. Once the current buffer 635(a–n) is loaded, at block 934, the transfer logic 615 determines if there is another buffer 635(a–n) that needs to be serviced. Whether another buffer 635(a–n) needs servicing is determined by the second process, which, as mentioned above, searches for a next buffer 635(a–n) that needs servicing.

The steps of the second process begin at block 950, where it is determined whether the slot_count variable has reached the reverse bearer slot 504. The starting_slot, as mentioned above, points to the next slot 504 after the reverse bearer slot 504. If the slot_count, at the block 950, has not processed all the slots 504 up the reverse bearer slot, it means that additional slots 504 remain to be analyzed. Accordingly, at block 952, the slot_count is incremented to point to the next slot 504. If the slot_count, at the block 950, reaches the reverse bearer slot 504, then the second process, at block 951, terminates.

At block 954, the transfer logic 615 analyzes the mask and load bits of the buffer 635(a–n) corresponding to the slot 504 identified by the slot_count variable. The transfer logic 615 utilizes the slot to buffer link table 632 to associate the slot 504 identified by the slot_counter variable to its corresponding buffer 635(a–n). If the mask and load bits of the buffer 635(a–n) corresponding to the slot 504 that is identified by the slot_counter are not zero, then, at the block 950, the transfer logic 615 once again determines if the slot_count variable points to the reverse bearer slot 504. The slot_count variable continues to be incremented until the reverse bearer slot 504 has been reached or the mask and load bits of the buffer 635(a–n) being analyzed equal zero. If the mask and load bits of the buffer 635(a–n) corresponding to the slot 504 that is identified by the slot_counter are zero, then, at block 960, the base address of that buffer 635(a–n) is stored in a register for later use, and, at block 962, the another_DMA_needed variable is set to yes. The second process, at block 964, waits until the first process finishes loading the current buffer 635(a–n). When the current buffer 635(a–n) has been loaded, the another_DMA_needed variable is set to no at block 966. The second process then loops back to the block 950.

The DRQ on the line 640 is de-asserted when it is determined that no more buffers 635(a–n) of the slots 504 for a given frame 500 need servicing. If it is determined, at the block 934, that another buffer 635(a–n) needs servicing, the transfer logic 615 clears the word_addr variable, at block 970, and starts the data transfer for the buffer 635(a–n) starting at the address found in the second process block 960, plus a word address of zero. When no more buffers 635(a–n) of the slots 504 for a given frame 500 need servicing, then transfer logic 615 de-asserts the DRQ one the line 640 at block 975.

Figure 15:
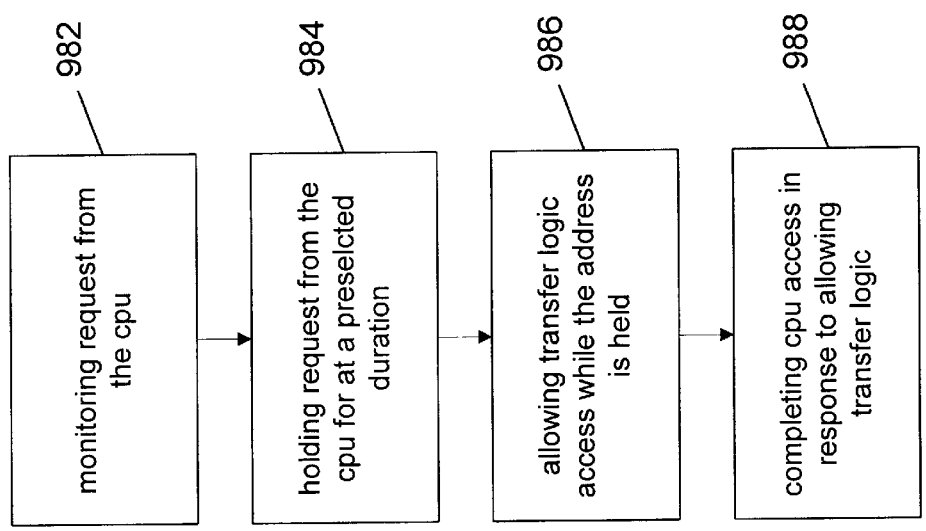
FIG. 15 illustrates a method in accordance with the present invention that can be employed by the Wireless Subscriber Unit illustrated in FIG. 6.

In accordance with the present invention, the arbiter 622, as per an arbitration scheme illustrated in FIG. 15, allows both the CPU 630 and the transfer logic 615 via the DMA controller 620 to access the packet data memory 610 with substantially no wait states. To facilitate the arbitration scheme, in one embodiment, the bandwidth of the global data bus 624a is doubled relative to the data bus 623a of the CPU 630, and the bus arbiter 622 is implemented to interface the data bus 623a of the CPU 630 with the global data bus 624a. The arbiter 622 arbitrates access to the global address and data buses 624a, 624b between the CPU 630, the transfer logic 615, and other blocks (not shown) within the WLL controller 440. The CPU 630, as described below, is assigned fixed times for no wait-state access which is managed by the arbiter 622. Arbitration between transfer logic 615 and other blocks (not shown) is accomplished by scheduling.

Figure 16:
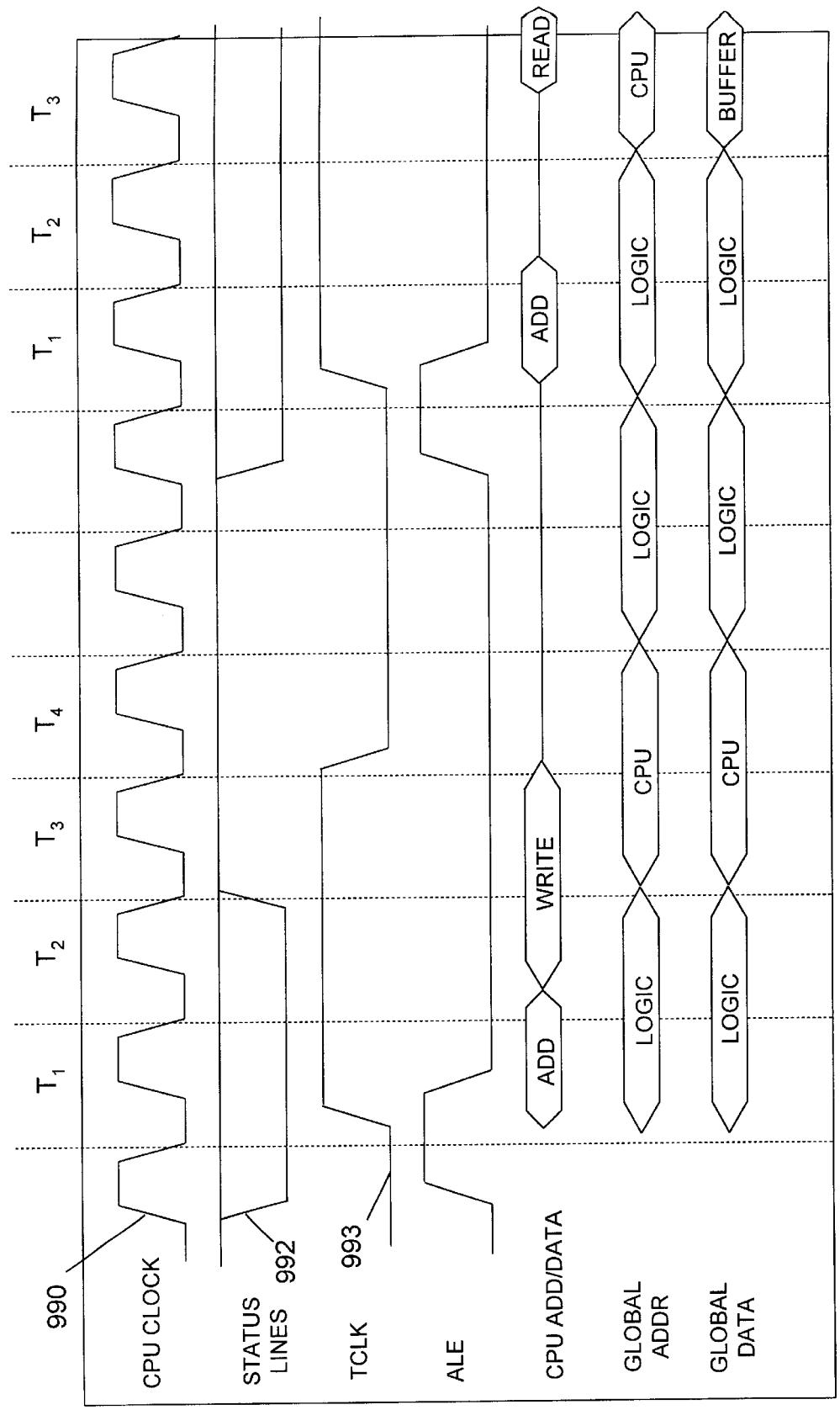
FIG. 16 depicts an exemplary diagram illustrating the method of FIG. 15.

The arbitration scheme of FIG. 15 can be more clearly illustrated with reference to an exemplary timing diagram of FIG. 16. In general, the arbiter 622 resolves conflicts between the CPU 630 and the transfer logic 615 by restricting the CPU 630 access to the packet data memory 610 to states T3 and T4 of the CPU clock cycle 990 and the transfer logic 615 to states T1 and T2. The arbitration scheme of FIG. 15 begins at block 982, where the arbiter 622 monitors requests from the CPU 630 to access the packet data memory 610. One way the arbiter 622 monitors requests from the CPU 630 is by monitoring the status lines 992 of the CPU 630, as seen in FIG. 16. The arbiter 622 generates a TCLK signal 993, an active high signal, which is monitored by the transfer logic 615. The TCLK signal 993 is asserted on the falling edge of the CPU clock that begins at the T1 state of any CPU access to the packet data memory 610. The TCLK signal 993 is de-asserted on the falling edge of the CPU clock 990 that begins the T4 state of a clock cycle in which it is active. If the TCLK signal 993 is inactive on the rising edge of the CPU clock 990, the transfer logic 615 may, in one embodiment, access the bus 624a, 624b for two successive CPU clock cycles beginning at the following edge.

Referring back to FIG. 15, at block 984, once the CPU 630 initiates a memory request, the arbiter 622 holds that request for a preselected duration. In one embodiment, the preselected duration may include at least one clock cycle. The step of the block 984 may be illustrated with reference to FIG. 16, where the arbiter 622 synchronizes itself with the bus 623a, 623b of the CPU 630 and then latches the request from the CPU 630 for states T1 and T2 of the CPU clock 990. At block 986, the arbiter 622 allows the transfer logic 615 to access the packet data memory 610 during states T1 and T2 of the CPU clock 990, while the request from the CPU 630 is held. At block 988, the arbiter 622 allows the request from the CPU 630 to complete in response to the access by the transfer logic 615. As can been seen in FIG. 16, the arbiter 622 allows the request from the CPU 630 to complete during T3 and T4 states of the CPU clock 990. Because it is desirable for the CPU 630 to have a zero wait state access to packet data memory 610, the arbiter 622 will drive the SRDY and TCLK signals 993 substantially identically. SRDY is a synchronous input signal to the CPU 630 that may be used to force wait states into the CPU bus cycle. ALE is a signal generated by the CPU 630. The trailing edge of ALE is used to indicate when the address on the multiplexed address/data bus 624a, 624b may be latched.

Although the bus arbitration scheme of the present invention is described with respect to resolving conflicts between the CPU and the transfer logic, those skilled in the art will appreciate that the instant bus arbitration scheme may be employed in a variety of applications where multiple devices attempt to access a common resource. The multiple devices (i.e., also referred to as access devices) may be controllers, microprocessors, logical devices, or a combination thereof. The common resource may be a memory, or any other resource that may be accessed.

An efficient bus arbitration scheme is desirable in improving performance of the WLL controller 440. The CPU 630 requires access to the buses 624a, 624b to program registers (not shown) used to configure devices (not shown) and place the devices into the proper states. The CPU 630 also requires significant bus 624a, 624b bandwidth to support data transfers between memory 460 and buffers 635(a–n).

Figure 12:
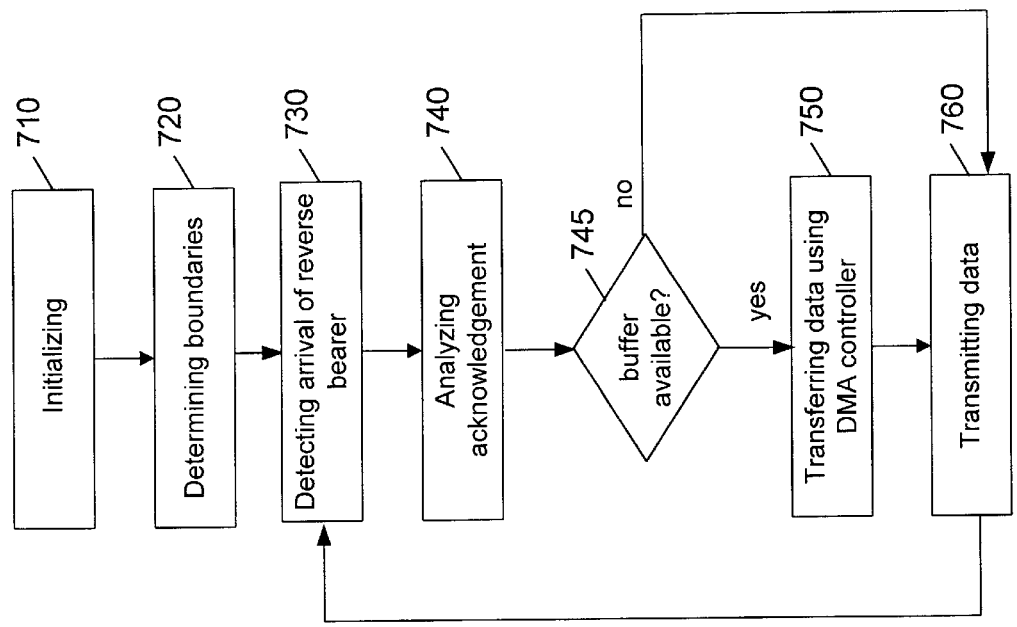
FIG. 12 illustrates a method in accordance with the present invention that may be employed by the Wireless Subscriber Unit illustrated in FIG. 6.
Figure 13:
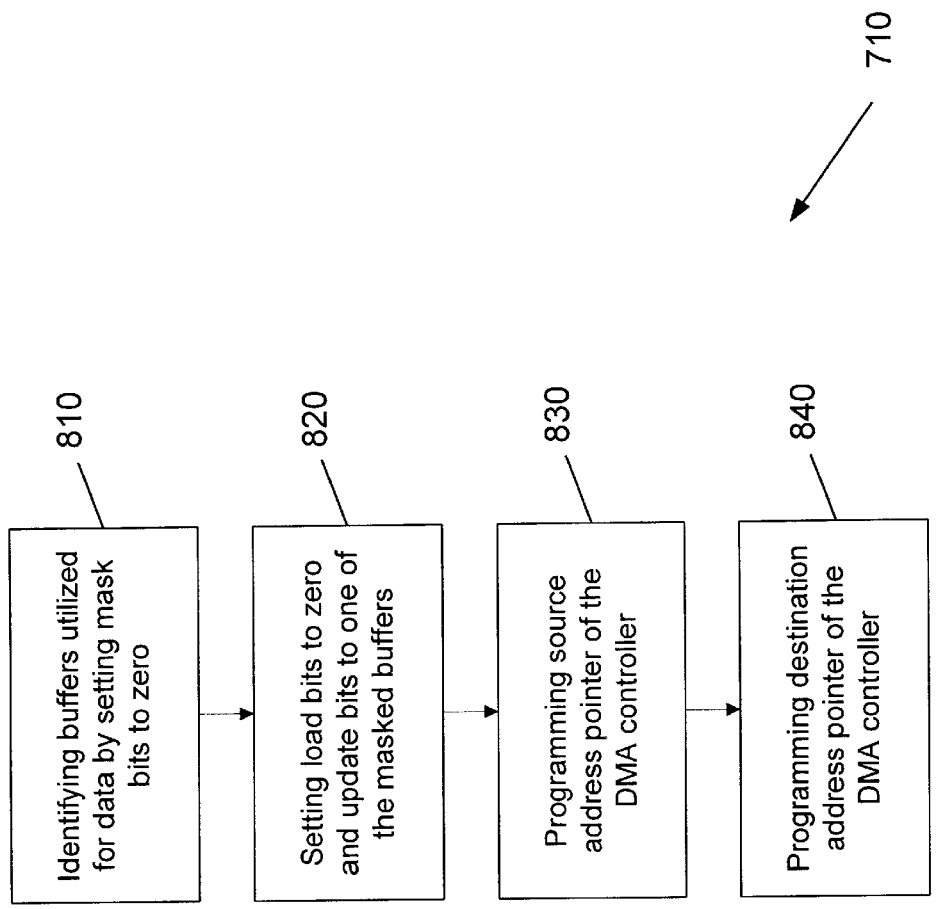
FIG. 13 illustrates a method in accordance with the present invention that may be employed by the Wireless Subscriber Unit illustrated in FIG. 6.

As can be seen with reference to FIGS. 7 and 12, the transfer logic 615, in conjunction with the mask and load bits, manages the transfer of varying amounts of data from the external memory 460 to the packet data memory 610. Additionally, the data transfer occurs in accordance with a priority scheme. In the illustrated embodiment, the priority scheme entails transferring data into the corresponding buffers 635(a–n) of the slots 504 sequentially after the reverse bearer slot 504. Accordingly, the priority scheme employed in the present invention ensures that new data will be fetched into buffers 635(a–n) in a timely manner after the detection of the reverse bearer slot 504. By making new data available to slots 504 (via the corresponding buffers 635 (a–n)) that follow the reverse bearer slot 504, the present invention improves the overall throughput of the communications system 200, 400, since there will be fewer empty slots 504 for a given frame transmission. Once the buffers 635(a–n) of the packet data memory 610 have been loaded with new data, the WLL controller 440 of the WSU 310 transfers the data to the BTS 320.

Although the present invention is described with reference to transferring data from the external memory 460 to the packet data memory 610, it is contemplated that the present invention also employed for transferring data from the packet data memory 610 to the external memory 460 without a need of continuously reprogramming the DMA controller 620 before each data transfer. That is, the transfer logic 615, in conjunction with the mask and load bits is also capable of transferring varying amounts of data from the packet data memory 610 to the external memory 460 during a downlink connection. During a downlink connection, the data is retrieved into the unmasked buffers 635(a–n) and eventually transferred to the external memory 460. Because the process of transferring varying amounts of data from the packet data memory 610 to the external memory 460 in a downlink connection may be accomplished in a similar manner as described above for an uplink connection, such a process is not described in detail herein.

Those skilled in the art will appreciate that the above-described embodiments with respect to the WLL network 300 may also be pertinent with respect to other communications systems 200 (see FIG. 2) as well. Furthermore, although the present invention has been described with reference to communications systems 200, 300, the application of the present invention is not limited as such. It is contemplated that the application of the present invention may be extended to other technologies as well, including, but not limited to, data processing systems and other electronic devices where quick access to information is desirable.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. An apparatus, comprising:
   a data controller having an input terminal and an output terminal capable of providing packet data;
   a source for storing data, wherein the data controller is capable of storing data in the source;
   a subscriber line audio-processing circuit capable of providing signals in a voice band; and
   a controller capable of transmitting at least one of signals in the voice band from the subscriber line audio-processing circuit and the packet data from the output terminal of the data controller, wherein the controller includes:
      a memory having a first portion configured to receive the data from the source;
      an access controller capable of transferring data from the source to the first portion of the memory in response to a memory request; and
      control logic capable of:
         determining the size of the first portion of the memory; and
         providing the memory access request to the access controller to transfer a portion of the data from the source that corresponds to the size of the first portion of the memory in accordance with a priority scheme that determines the sequence of the data transfer.

2. The apparatus of claim 1, further including:
   association logic capable of associating a frame with at least one corresponding memory location containing data in the first portion of the memory;

means for transmitting at least a portion of data from the first portion of the memory within the frame; and means for receiving an acknowledgement in response to transmitting the data within the frame.

3. The apparatus of claim 2, further including acknowledgement analysis logic capable of analyzing the acknowledgement to determine if the data within the frame transmits successfully.

4. The apparatus of claim 3, further including control logic capable of updating the corresponding memory location with new data in response to determining if the data transmits successfully.

5. The apparatus of claim 4, wherein the frame comprises one more slots, each slot capable of carrying data, and wherein the association logic includes a first link table capable of identifying active slots.

6. The apparatus of claim 5, wherein the frame comprises one more slots, each slot capable of carrying data, and wherein the first link table is capable of associating each active slot with at least one corresponding memory location.

7. The apparatus of claim 6, wherein the association logic includes a second link table capable of associating the logical bearer numbers to the slots.

8. The apparatus of claim 7, wherein the second link table is capable of being updated substantially simultaneously in response to an update to the first link table.

9. The apparatus of claim 8, wherein the acknowledgement analysis logic is capable of:

extracting the acknowledgements on logical bearer numbers;

finding the slots corresponding to logical bearer numbers using the second link table;

indexing the first link table using the slots to determine if those slots are active; and identifying the memory locations associated with the active slots.

10. The apparatus of claim 9, wherein the acknowledgement analysis logic is capable of setting a control bit for each slot indicating whether new data is required in response to determining if the data transmits successfully.

11. The apparatus of claim 1, wherein the first portion of the memory includes a second portion and wherein the control logic is capable of determining the size of the second portion of the memory and capable of providing the memory access request to the access controller to transfer a portion of the data from the source that corresponds to the size of the second portion of the memory.

12. The apparatus of claim 11, wherein the first portion of the memory comprising a plurality of buffers and the second portion comprising at least a subset of the plurality of the buffers.

13. The apparatus of claim 12, wherein the control logic is capable of transferring the portion of the data according to the priority scheme includes transferring the data to the subset of plurality of buffers based on the order the data from the plurality of buffers is transmitted.

14. The apparatus of claim 13, wherein the control logic is capable of transferring a portion of data from the source at least one of the plurality of buffers while substantially simultaneously determining if another buffer requires new data.

15. The apparatus of claim 1, wherein the subscriber line audio-processing circuit is capable of providing the tip and ring interface.

16. The apparatus of claim 1, wherein the subscriber line audio-processing circuit is capable of supporting voiceband data.

17. The apparatus of claim 1, wherein the data controller is an ethernet controller.

18. A method, comprising:

receiving packet data using an integrated circuit having a subscriber line audio processing unit and a wireless local loop controller;

receiving signals in a voice band using the subscriber line audio processing unit of the integrated circuit;

processing the signals in the voice band and the packet data using the integrated circuit, wherein processing the signals using the integrated circuit comprises:

accessing a request to transfer data from a source to a memory;

determining a size of a first portion of the memory; and transferring a first portion of the data that corresponds to the size of the first portion of the memory from the source to the memory in accordance with a priority scheme that determines the sequence of the data transfer; and transmitting the signals processed by the integrated circuit over a wireless medium using a transmitting module.

19. The method of claim 18, wherein processing the signals comprises loading the processed signals in a DECT frame for transmission to a remote unit.

* * * * *